(12) United States Patent
Gorman

(10) Patent No.: US 8,193,287 B2
(45) Date of Patent: Jun. 5, 2012

(54) PROCESS FOR BROMINATING BUTADIENE COPOLYMERS BY THE ADDITION OF WATER OR CERTAIN SOLVENTS

(75) Inventor: David B. Gorman, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 12/866,992

(22) PCT Filed: Feb. 25, 2009

(86) PCT No.: PCT/US2009/035046
§ 371 (c)(1),
(2), (4) Date: Aug. 10, 2010

(87) PCT Pub. No.: WO2009/139942
PCT Pub. Date: Nov. 19, 2009

(65) Prior Publication Data
US 2011/0021715 A1    Jan. 27, 2011

Related U.S. Application Data

(60) Provisional application No. 61/034,355, filed on Mar. 6, 2008.

(51) Int. Cl.
*C08F 8/20* (2006.01)

(52) U.S. Cl. .................. 525/355; 525/359.1; 525/359.5; 525/333.4

(58) Field of Classification Search ............... 525/359.1, 525/359.5, 355, 333.4
See application file for complete search history.

(56) References Cited

U.S. PATENT DOCUMENTS

| 5,677,390 A | 10/1997 | Dadgar |
| 5,686,358 A | 11/1997 | Choi |
| 5,767,203 A | 6/1998 | Ao |
| 6,232,393 B1 | 5/2001 | Dadger |
| 6,232,408 B1 | 5/2001 | Dadger |
| 6,235,831 B1 | 5/2001 | Reed |
| 6,235,844 B1 | 5/2001 | Dadgar |
| 2008/0287559 A1 | 11/2008 | King |
| 2010/0004402 A1 | 1/2010 | King |

FOREIGN PATENT DOCUMENTS

| EP | 359269 A | 3/1990 |
| GB | 383154 A | 11/1932 |
| WO | 99/55770 A | 11/1999 |

OTHER PUBLICATIONS

Avramoff et al. "The brominating Properties of tetramethylammonium tribromide" J.Org.Chem., 28, 3256-3258(1963).*
Buckles et al, "Spectrophotometric Study of Tetrabutylammonium Tribromide", Oct. 1951.
Conte et al., Mimicking the vanadium Bromoperoxidases Reactions . . . Tetrahedron Letters 35, 7429-7432 (1994).
Avramoff et al., "The Brominating Properties of Tetrametylammonium Tribromide", 1963.
Collado et al., "Nucleophilic 1,2 Addition of Bromine to Electron deficient double bonds by perbromide reagents", Tetrahedron 50, 6433-6440 (1994).
Muathen, "1,8 diazabicyclo[5.4.0]undec-7-ene hydrobromide perbromide . . . ", J. Org. Chem. 1992, 57, 2740-2741.
Bora et al., "Regioselctive Bromination of Organic Substrates . . . ", Org. Letters. 2000, 2, 247-249.
Buzdugan et al., "Bromination of Some Styrene-Diene Block Copolymers", Eur. Polym. J. 33, 1713-1716 (1997).

* cited by examiner

*Primary Examiner* — Ling-Siu Choi
(74) *Attorney, Agent, or Firm* — Gary C Cohn PLLC

(57) ABSTRACT

Butadiene copolymers are brominated using certain quaternary ammonium tribromides as the brominating agent. The bromination process proceeds easily under mild conditions, and produces a brominated product that has excellent thermal stability. A quaternary ammonium monobromide salt is produced as a reaction by-product. A solvent for the monobromide salt is added to the reaction after 25-90% bromination of the aliphatic carbon-carbon double bonds. This provides for significantly shorter reaction times while providing a product with few impurities.

11 Claims, No Drawings

PROCESS FOR BROMINATING BUTADIENE COPOLYMERS BY THE ADDITION OF WATER OR CERTAIN SOLVENTS

This application claims priority from U.S. Provisional Patent Application No. 61/034,355, filed 6 Mar. 2008.

The present invention relates to a process for brominating a butadiene copolymer, such as a brominated block, random or graft copolymer of styrene and butadiene.

WO 2008/021417 describes a process for brominating a butadiene copolymer. The brominating agent is a phenyltrialkylammonium tribromide, benzyltrialkylammonium tribromide or tetraalkylammonium tribromide. The process is conducted with the copolymer in solution. A highly selective bromination of aliphatic carbon-carbon double bonds is achieved, leaving the aromatic rings essentially unaffected. The process is preferably run in a chlorinated solvent that does not contain oxygen. This helps to minimize the formation of ether groups on the polymer, which is beneficial because the ether groups often adversely affect the thermal stability of the brominated polymer. Another advantage is that surprisingly little halogen exchange occurs between the brominated polymer and the chlorinated solvent, if temperature conditions are controlled to below about 80° C.

A potential use for the brominated polymer is as a flame retardant additive for thermoplastic polymers such as polystyrene. The thermal characteristics of the brominated polymer are very important in that application. The thermoplastic polymer is typically blended with the brominated polymer in a melt blending process. The blend is in most cases simultaneously or subsequently melt processed to form a fabricated product. For example, the blend can be melt processed by extruding it to form foamed or unfoamed articles, by injection molding, by melt casting, or by other processes that involve melting the blend in order to convert it into the desired product form. The brominated polymer must be heat-stable at the temperatures encountered during the melt blending and melt processing operations. In addition, the brominated polymer must be able to decompose under fire conditions to liberate bromine or hydrogen bromide. If the brominated polymer is too heat-stable, it does not decompose at the correct temperature and is ineffective as a flame retardant. It has been found that a brominated polybutadiene copolymer can have the thermal characteristics which are needed for the flame retardant applications, if it is prepared carefully by minimizing certain side reactions. The process described in WO 2008/021417 produces a brominated polybutadiene copolymer having the desired thermal characteristics.

A problem with the bromination process described in WO 2008/021417 is that the reaction proceeds slowly under reaction conditions that are otherwise advantageous. The long reaction time impacts throughput capacity in any given manufacturing equipment. The longer reaction times mean that larger or more equipment is needed to produce a given amount of product per unit time. For that reason, the process is more capital-intensive than would be desired. It would be desirable to increase the rate of reaction, so throughputs can be increased and capital costs correspondingly reduced. Simply increasing the reaction rate by raising the reaction temperature is not a viable solution to this problem, because unwanted side reactions tend to be more prevalent at the higher reaction temperatures. These unwanted reactions can include the halogen exchange reaction mentioned above, as well as hydrobromination reactions, ring halogenation, halogenation at tertiary carbon atoms, the formation of hydroxyl groups, as well as others. These side reactions in most cases reduce the thermal stability of the brominated polymer, and therefore make the polymer less useful as a flame retardant additive.

Therefore, a process which can more rapidly prepare a brominated butadiene polymer having good thermal characteristics would be desired.

The present invention is in one aspect a process comprising reacting a butadiene polymer containing aliphatic carbon-carbon double bonds with a phenyltrialkylammonium tribromide, benzyltrialkylammonium tribromide or tetraalkylammonium tribromide in the presence of at least one solvent for the butadiene polymer, to form a brominated butadiene polymer and a phenyltrialkylammonium monobromide, benzyltrialkylammonium monobromide or tetraalkylammonium monobromide by-product, wherein a solvent for the phenyltrialkylammonium monobromide, benzyltrialkylammonium monobromide or tetraalkylammonium monobromide by-product is added to the reaction mixture when from about 25 to 90% of the aliphatic carbon-carbon double bonds in the butadiene polymer have been brominated, and the remainder of the bromination reaction is conducted in the presence of the solvent for the phenyltrialkylammonium monobromide, benzyltrialkylammonium monobromide or tetraalkylammonium monobromide by-product.

In another aspect, the invention is a process comprising reacting a butadiene polymer containing aliphatic carbon-carbon double bonds with a phenyltrialkylammonium tribromide, benzyltrialkylammonium tribromide or tetraalkylammonium tribromide in the presence of at least one solvent for the butadiene polymer, to form a brominated butadiene polymer and a phenyltrialkylammonium monobromide, benzyltrialkylammonium monobromide or tetraalkylammonium monobromide by-product, wherein water is added to the reaction mixture when from about 25 to 90% of the aliphatic carbon-carbon double bonds in the butadiene polymer have been brominated, and the remainder of the bromination reaction is conducted in the presence of the water.

The addition of a solvent for the quaternary ammonium monobromide by-products leads to a dramatic increase in the rate of the bromination reaction, which means that a shorter reaction time is needed to obtain a given conversion of the aliphatic carbon-carbon double bonds. Water is an especially preferred solvent for the quaternary ammonium monobromide by-products, because of its low cost, ready availability and good performance.

The timing of the addition of the solvent for the monobromide by-products has been found to significantly affect the quality of the product. Impurity formation is minimized when the solvent for the monobromide by-products is not added into the reaction until the conversion of aliphatic carbon-carbon double bonds on the butadiene polymer is at least 25%. If the solvent for the monobromide by-products is added before about 25% conversion, impurity levels tend to increase significantly. Because the impurities tend to reduce the thermal stability of the product brominated polymer, it is highly desirable to reduce their formation by delaying the introduction of the solvent for the monobromide impurities. On the other hand, if the solvent for the monobromide by-products is not added before about 90% conversion, much of the benefit of faster reaction rates is lost. When the solvent for the monobromide by-product is introduced when the conversion is from 25 to 90%, and the remainder of the reaction is conducted in the presence of that solvent, the dual benefits of shorter reaction times and low impurity formation can be seen.

A polymer of butadiene is the starting material in this process. The butadiene polymer may be a homopolymer, or a copolymer of butadiene and one or more other monomers. A copolymer may be a random, block or graft copolymer, and should contain at least 10% by weight of polymerized polybutadiene. Butadiene polymerizes to form two types of repeating units. One type, referred to herein as "1,2-butadiene units" takes the form

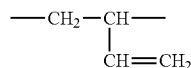

and so introduce pendant unsaturated groups to the polymer. The second type, referred to herein as "1,4-butadiene" units, takes the form —CH$_2$—CH=CH—CH$_2$—, introducing unsaturation into the main polymer chain. The butadiene polymer should contain at least some 1,2-butadiene units. Of the butadiene units in the butadiene polymer, suitably at least 10%, preferably at least 15% and more preferably at least 20% and even more preferably at least 25% are 1,2-butadiene units. 1,2-butadiene units may constitute at least 50%, at least 55%, at least 60% or at least 70% of the butadiene units in the butadiene polymer. The proportion of 1,2-butadiene units may be in excess of 85% or even in excess of 90% of the butadiene units in the polymer.

Methods for preparing butadiene polymers with controlled 1,2-butadiene content are described by J. F. Henderson and M. Szwarc in *Journal of Polymer Science* (D, Macromolecular Review), Volume 3, page 317 (1968), Y. Tanaka, Y. Takeuchi, M. Kobayashi and H. Tadokoro in *J. Polym. Sci.* A-2, 9, 43-57 (1971), J. Zymona, E. Santte and H. Harwood in *Macromolecules*, 6, 129-133 (1973), and H. Ashitaka, et al., in *J. Polym. Sci., Polym. Chem.*, 21, 1853-1860 (1983).

A preferred starting material is a random, block or graft copolymer of butadiene and at least one vinyl aromatic monomer. A "vinyl aromatic" monomer is an aromatic compound having a polymerizable ethylenically unsaturated group bonded directly to a carbon atom of an aromatic ring. Vinyl aromatic monomers include unsubstituted materials such as styrene and vinyl naphthalene, as well as compounds that are substituted on the ethylenically unsaturated group (such as alpha-methylstyrene, for example), and/or are ring-substituted. Ring-substituted vinyl aromatic monomers include those having halogen, alkoxyl, nitro or unsubstituted or substituted alkyl groups bonded directly to a carbon atom of an aromatic ring. Examples of such ring-substituted vinyl aromatic monomers include 2- or 4-bromostyrene, 2- or 4-chlorostyrene, 2- or 4-methoxystyrene, 2- or 4-nitrostyrene, 2- or 4-methylstyrene and 2,4-dimethylstyrene. Preferred vinyl aromatic monomers are styrene, alpha-methyl styrene, para-methyl styrene, and mixtures thereof.

"Vinyl aromatic units" are repeating units in the starting material that are formed when a vinyl aromatic monomer is polymerized. A suitable butadiene/vinyl aromatic starting copolymer contains from 5 to 90 percent by weight of polymerized vinyl aromatic monomer units and at least 10% by weight of polymerized butadiene.

A butadiene/vinyl aromatic copolymer may be a random, block (including multiblock such as diblock or triblock types) or graft type of copolymer. Styrene/butadiene block copolymers are widely available in commercial quantities. Those available from Dexco Polymers under the trade designation VECTOR™ are suitable. Styrene/butadiene random copolymers may be prepared in accordance with the processes described by A. F. Halasa in *Polymer*, Volume 46, page 4166 (2005). Styrene/butadiene graft copolymers may be prepared in accordance with methods described by A. F. Halasa in *Journal of Polymer Science* (Polymer Chemistry Edition), Volume 14, page 497 (1976). Styrene/butadiene random and graft copolymers may also be prepared in accordance with methods described by Hsieh and Quirk in chapter 9 of *Anionic Polymerization Principles and Practical Applications*, Marcel Dekker, Inc., New York, 1996.

The butadiene polymer may also contain repeating units formed by polymerizing monomers other than butadiene and a vinyl aromatic monomer. Such other monomers include olefins such as ethylene and propylene, acrylate or acrylic monomers such as methyl methacrylate, methyl acrylate, acrylic acid, and the like. These monomers may be randomly polymerized with the butadiene, may be polymerized to form blocks, or may be grafted onto the butadiene polymer.

The most preferred type of butadiene polymer is a block copolymer containing one or more polystyrene blocks and one or more polybutadiene blocks. Among these, diblock copolymers and triblock copolymers having a central polybutadiene block and terminal polystyrene blocks are especially preferred.

The butadiene polymer has a weight average molecular weight ($M_w$) within a range of from 1,000 to 400,000, preferably from 2,000 to 300,000, more preferably from 5,000 to 200,000 and even more preferably from 50,000 to 175,000. For purposes of this invention, molecular weights are apparent molecular weights as measured by Gel Permeation Chromatography (GPC), relative to a polystyrene standard. GPC molecular weight determinations can be performed using an Agilent 1100 series liquid chromatograph equipped with two Polymer Laboratories PLgel 5 micrometer Mixed-C columns connected in series and an Agilent G1362A refractive index detector, with tetrahydrofuran (THF) flowing at a rate of 1 mL/min and heated to a temperature of 35° C. as the eluent.

The brominating agent used in this invention is a quaternary ammonium tribromide selected from one or more of a phenyltrialkylammonium tribromide, benzyltrialkylammonium tribromide or a tetraalkylammonium tribromide. Examples of these include phenyltrimethylammonium tribromide, benzyltrimethylammonium tribromide, tetramethylammonium tribromide, tetraethylammonium tribromide, tetrapropylammonium tribromide, tetra-n-butylammonium tribromide and the like.

The quaternary tribromide brominating agent can be prepared by mixing the corresponding quaternary ammonium monobromide salt with elemental bromine. The monobromide salt is usually water-soluble, so a convenient way of making the tribromide is to add elemental bromine to an aqueous solution of the monobromide salt. This reaction proceeds well at approximately room temperature, but higher or lower temperatures can be used if desired. The tribromide tends to precipitate from the aqueous phase, and so may be recovered from the liquid phase by any convenient solid-liquid separation method. Because the quaternary ammonium tribromide is soluble in organic solvents, it can be separated from the aqueous phase by extraction with an organic solvent to form a solution of the quaternary ammonium tribromide in the organic solvent. The tribromide is soluble in many organic solvents and may be dissolved in such a solvent if desired to facilitate the addition of the tribromide into the reaction mixture. If the organic solvent is used, it is preferably also a solvent for the butadiene polymer and most preferably is the same solvent used to dissolve the butadiene polymer. If the tribromide is prepared in the presence of water, it is separated from the water before being contacted with the butadiene polymer.

The bromination reaction is performed in a solvent for the butadiene polymer. For convenience, the solvent for the butadiene polymer is sometimes referred to herein as the "first" solvent. The first solvent preferably is a solvent for the ammonium tribromide brominating agent, but not a solvent for the ammonium monobromide by-product that is formed in the reaction. Examples of suitable first solvents include ethers such as tetrahydrofuran; halogenated alkanes such as carbon tetrachloride, chloroform, dichloromethane, bromochloromethane ($CH_2BrCl$) and 1,2-dichloroethane; hydrocarbons such as cyclohexane and toluene; and halogenated aromatic compounds such as bromobenzene, chlorobenzene and dichlorobenzene. A preferred type of first solvent is one which is a liquid under the bromination conditions and which does not undesirably react with the brominating agent. The first solvent is preferably aprotic and is not oxygenated, as oxygen-containing solvents can engage in addition reactions across the aliphatic double bonds of the butadiene/vinyl aromatic copolymer, leading to a deterioration of the thermal properties of the product. Halogenated and hydrocarbon solvents are therefore preferred as the first solvent over oxygen-containing solvents. It has been found that halogen exchange reactions do not occur to a significant extent when mild reaction conditions are used, and for that reason chlorinated solvents are very suitable for use in the invention.

The solvent for the quaternary ammonium monobromide salt is sometimes referred to herein as the "second solvent", for purposes of convenience and to distinguish it readily from the "first" solvent, i.e., the solvent for the butadiene polymer. Suitable solvents for the quaternary ammonium monobromide (the second solvent) include polar compounds which are not reactive with the starting butadiene polymer, the brominated butadiene polymer, the quaternary ammonium tribromide or the first solvent, under the conditions of the bromination reaction. The second solvent is preferably liquid under the conditions of the brominating reaction. The second solvent may be aprotic or protic. It may or may not be miscible with the first solvent, but most preferably is not miscible with it, so it is easier to separate and recover the second solvent (with dissolved quaternary ammonium monobromide salt) from the first solvent and the brominated butadiene polymer. Water is by far the most preferred second solvent.

The bromination reaction is conducted by mixing the butadiene polymer, solvent and quaternary ammonium tribromide together and allowing the mixture to react until the desired proportion of butadiene units have been brominated. "Bromination" in the context of this invention refers to the addition of two bromine atoms across a carbon-carbon double bond, such that each of the carbon atoms becomes bonded to a bromine atom. The order of addition of the butadiene polymer, quaternary ammonium tribromide and first solvent is not especially important, except that if the tribromide and butadiene/vinyl aromatic copolymer are mixed first, it is preferred to add the solvent before significant reaction occurs.

The first solvent is used in quantities sufficient to dissolve the butadiene polymer under the conditions of the reaction. The concentration of the butadiene polymer in the solvent may range from, for example, 1 to 50% by weight, especially from 5 to 35% by weight.

About 0.5 to about 5 moles of the quaternary ammonium tribromide are suitably used per mole of butadiene units in the butadiene polymer; a more suitable amount is from about 0.9 to about 2.5 moles/mole and an even more suitable amount is from 1 to 1.5 moles/mole.

Generally, only mild conditions are needed to effect the bromination. Bromination temperatures can range from −20 to 100° C., and are preferably from 0 to 90° C. and especially from 40 to 80° C. Temperatures higher than 100° C. could be used, but are not necessary and may lead to a loss of selectivity and/or an increase in by-products. The tribromide becomes converted to the corresponding quaternary ammonium monobromide salt as the reaction proceeds. The quaternary ammonium monobromide salt is in most cases insoluble in the first solvent and butadiene polymer, and tends to precipitate out of the polymer solution.

After the butadiene polymer is partially brominated, the "second" solvent, i.e., the solvent for the quaternary ammonium monobromide salt, is introduced into the reaction mixture. In general, the amount of the second solvent is sufficient to provide a reduction of the time necessary to obtain the desired conversion, compared to an otherwise like case in which the second solvent is not added. The second solvent may be introduced in an amount sufficient to dissolve at least 50%, more preferably at least 80%, even more preferably at least 95% of the quaternary ammonium monobromide salt that forms as the bromination reaction proceeds, although it may be possible to use lesser amounts of the second solvent. It is believed that at least a portion of the quaternary ammonium monobromide salt becomes dissolved in the second solvent.

The second solvent is introduced after about 25% of the aliphatic carbon-carbon double bonds on the butadiene polymer have been brominated (i.e., after at least 25% conversion). Prior to this introduction of the second solvent after partial conversion of the aliphatic carbon-carbon double bonds, the reaction mixture should be essentially devoid of solvent for the quaternary ammonium monobromide. It has been found that an earlier addition of the second solvent leads to a significantly greater amount of impurity formation. Preferably, the second solvent is not introduced until at least 50% conversion or until at least 60% conversion. The second solvent should be added no later than at the time of 90% conversion, preferably no later than about 80% conversion and even more preferably no later than 75% conversion. If added too late in the reaction, little benefit in terms of reduced reaction times is realized. There may be some trade-off on impurity levels against reaction rates, particularly if the second solvent is added before about 50% or 60% conversion or after about 80% conversion. After the second solvent is added, the bromination reaction is continued in the presence of the second solvent, preferably to at least 90% conversion, more preferably to at least 95% conversion and even more preferably to at least 97% conversion. Other than the presence of the second solvent, suitable conditions for the bromination reaction remain the same as described before. The reaction mixture should be agitated after adding the second solvent to provide good contact between the phases.

If desired, the reaction can be followed analytically to monitor the conversion of the aliphatic carbon-carbon double bonds. The extent of bromination can be determined using proton NMR methods. Residual aliphatic carbon-carbon double bonds can be determined by comparing integrated areas of signals due to appropriate protons (residual double bond protons are between 4.8 and 6 ppm) (relative to tetramethylsilane (TMS)), and protons for brominated polybutadiene (signals for which are between 3.0 and 4.8 ppm). A Varian INOVA™ 300 NMR spectrometer or equivalent device is useful for such determinations, suitably being operated with a delay time of 30 seconds to maximize relaxation of protons for quantitative integrations. A deutero-substituted solvent such as deutero-chloroform or d5-pyridine is suitable for diluting the sample for NMR analysis.

Under the conditions described above, the bromination reaction tends to be highly selective, in several respects. Little or no bromination occurs on the aromatic rings. Otherwise, bromination tends to take place at the carbon-carbon double bonds of both 1,2- and 1,4-butadiene units, and bromination tends to take place so that little bromination occurs at tertiary carbon atoms. It is believed that the bromination occurs through an ionic mechanism rather than a free radical mechanism that tends to introduce unwanted bromine at allylic or tertiary carbon atoms. Bromines bonded to allylic or tertiary carbon atoms are believed to be less thermally stable than other bromine-carbon bonds and therefore their presence adversely affects the temperature stability of the brominated copolymer. Hydrobromination (the addition of HBr across a carbon-carbon double bond) has been found to be minimal using this process.

The brominated butadiene polymer may become insoluble in the reaction mixture as the bromination reaction proceeds. In such a case, the product can be recovered using any convenient solid/liquid separation method such as filtration, decantation or the like. If the brominated polymer remains soluble in the reaction mixture, it is conveniently isolated from the mixture through a suitable method such as distillation of the solvent or addition of an anti-solvent which causes the brominated copolymer to become insoluble and precipitate. Examples of such anti-solvents include lower alcohols such as methanol, ethanol and 1-propanol, 2-propanol, n-butanol, and t-butanol.

The isolated polymer may be purified to remove residual bromine, brominating agent, solvent and by-products as desired or needed for a particular application. Bromide salts may be removed by passing the polymer through silica gel or an ion exchange resin bed. The polymer may be washed with an aqueous sodium hydrogen sulfite solution to neutralize or quench unreacted brominating agent that may be present. This effectively removes or eliminates any orange color that may be present in the polymer due to residual bromine or bromine compounds.

In one particular recovery method, the crude reaction solution can be formed into fine droplets, by spraying, for example, or by dispersing the crude reaction solution in a liquid in which it is immiscible. The first solvent is then thermally stripped from the droplets to form particles of the brominated butadiene polymer. Either before or after the thermal stripping step, the droplets or particles are washed in a nonsolvent liquid. The brominated polymer particles formed in this way are then separated from the nonsolvent liquid. There are several approaches to doing this. In one approach, the crude reaction mixture is sprayed to form droplets, which are thermally stripped (such as by spraying them together with steam) to form brominated butadiene particles, and the particles are subsequently dispersed in a non-solvent liquid, washed and recovered. In a second approach, the crude reaction mixture is sprayed to form droplets as before, but the droplets are dispersed in the non-solvent liquid before being thermally stripped. In this case, the heat for stripping is conveniently provided by introducing steam below the surface of the non-solvent liquid. In a third variation, the crude reaction mixture is introduced into the non-solvent liquid and formed into droplets while in the non-solvent liquid. The droplets are again thermally stripped while dispersed in the non-solvent liquid, where they are also washed.

The process of the invention tends to produce brominated copolymer products that have excellent thermal stability. A useful indicator of thermal stability is a 5% weight loss temperature, which is measured by thermogravimetric analysis as follows: 10 milligrams of the polymer is analyzed using a TA Instruments model Hi-Res TGA 2950 or equivalent device, with a 60 milliliters per minute (mL/min) flow of gaseous nitrogen and a heating rate of 10° C./min over a range of from room temperature (nominally 25° C.) to 600° C. The mass lost by the sample is monitored during the heating step, and the temperature at which the sample has lost 5% of its initial weight is designated the 5% weight loss temperature (5% WLT). This method provides a temperature at which a sample has undergone a cumulative weight loss of 5 wt %, based on initial sample weight. The brominated copolymer preferably exhibits a 5% WLT of at least 200° C. The 5% WLT is preferably at least 220° C., more preferably at least 230° C., even more preferably at least 240° C., and still more preferably at least 250° C. Brominated copolymers in which at least 85% of the butadiene units have been brominated, and which have such 5% WLT values, are of particular interest.

A further increase in thermal stability is sometimes seen if the brominated butadiene polymer is treated with an alkali metal base. The alkali metal base may be, for example, a hydroxide or a carbonate. The alkali metal base is preferably an alkali metal alkoxide, as the alkali metal alkoxides tend to provide more of an increase in thermal stability than do some other bases, such as alkali metal hydroxides, carbonates or carboxylates. The alkali metal can be lithium, sodium, potassium or cesium. Lithium, sodium and potassium are preferred. The base is an alkali metal alkoxide in preferred embodiments. The alkoxide ion can contain from 1 to 8, preferably from 1 to 4, carbon atoms, with methoxide and ethoxide being especially preferred. Especially preferred alkali metal alkoxides are lithium methoxide, sodium methoxide, potassium methoxide, lithium ethoxide, sodium ethoxide and potassium ethoxide. The brominated butadiene polymer can be treated with as little as 0.01 mole of the alkali metal base per mole of polymerized butadiene units in the copolymer (whether brominated or unbrominated). There is no upper limit on the amount of alkali metal base, although cost and handling considerations mitigate against using more than about 1 mole of the alkali metal base per mole of polymerized (brominated or unbrominated) butadiene units in the copolymer. A preferred amount is from 0.03 to 0.50 moles/mole of polymerized (brominated or unbrominated) butadiene units, and an especially preferred amount is from 0.05 to 0.20 moles/mole.

The brominated butadiene polymer is useful as a flame retardant additive for a variety of organic polymers. Organic polymers of interest include vinyl aromatic or alkenyl aromatic polymers (including alkenyl aromatic homopolymers, alkenyl aromatic copolymers, or blends of one or more alkenyl aromatic homopolymers and/or alkenyl aromatic copolymers), as well as other organic polymers in which the brominated copolymer is soluble or can be dispersed to form domains of less than 10 μm, preferably less than 5 μm, in size. Enough of the brominated butadiene polymer is preferably present in the blend to provide the blend with a bromine content within a range of from 0.1 percent by weight to 25 percent by weight, based upon blend weight.

Blends of the brominated butadiene polymer may include other additives such as other flame retardant additives, flame retardant adjuvants, thermal stabilizers, ultraviolet light stabilizers, nucleating agents, antioxidants, foaming agents, acid scavengers and coloring agents.

The following examples are provided to illustrate the invention, but not to limit the scope thereof. All parts and percentages are by weight unless otherwise indicated.

EXAMPLES 1 AND 2, AND COMPARATIVE RUNS A AND B

A series of experiments is run to evaluate the effect of adding water to a bromination reaction after various proportions of the butadiene units have been brominated.

A quaternary ammonium tribromide starting material is prepared by adding 252 parts deionized water, 252 parts (0.60 mole) of tetraethylammonium monobromide and 236 parts of methylene chloride to a flask equipped with a bottom drain, nitrogen inlet and overhead stirrer. 81 parts (0.51 mole) of bromine is added to the stirred mixture, which raises the temperature of the mixture from 14 to 20° C. The mixture is stirred for 15 minutes to produce a lower organic layer (which contains tetraethylammonium tribromide in solution) and an upper aqueous layer.

501 parts of a 9% solution of a polystyrene-butadiene-polystyrene block terpolymer (0.50 moles polymerized butadiene) in 1,2-dichloroethane are charged to a second reaction vessel, which is equipped with an addition funnel, overhead stirrer and nitrogen inlet. The organic tetraethylammonium tribromide solution (but not the aqueous layer) is added over about 2 minutes, with stirring and under a nitrogen flow, which results in an increase in the temperature of the vessel contents from 25° C. to 30° C. The reaction mixture is heated to 35-42° C. with continued stirring. 1.5 hours after the organic tetraethylammonium tribromide solution is added, the aqueous layer from the tetraethylammonium tribromide synthesis is added to the reaction vessel. Conversion of the aliphatic carbon-carbon double bonds is about 73% at the time the aqueous layer is added. The reaction is allowed to proceed for another 90 minutes at the same temperature. At his time, the reaction mixture is transferred to a flask equipped with a bottom drain, nitrogen inlet and overhead stirrer, and diluted with 256 parts of methylene chloride with stirring. The diluted mixture is then allowed to separate into aqueous and organic layers. The aqueous layer is removed, and the remaining organic layer is washed first with 99 parts of a 10% solution of sodium bisulfite in water and 443 parts of deionized water, and then with 479 parts of deionized water. The washed organic layer is then added to 2721 parts of 2-propanol, with stirring, to precipitate the brominated polymer. The organic liquids are filtered off, and the polymer particles are washed with 311 parts of 2-propanol. The particles are dried overnight. The resulting brominated polymer is a bright white powder. It is designated as Example 1. Proton NMR indicates that 98% of the aliphatic carbon-carbon double bonds have been brominated (98% conversion). Impurities detected by proton NMR are about 1%. "Impurities" here and in the remaining examples refers to undesired substituents detectable by proton NMR that have been introduced to the butadiene polymer during the bromination reaction, including, for example, hydrobromination, hydroxyl or ether group formation or bromination at allylic or tertiary carbon atoms. The 5% WLT for this material is 261° C.

Example 2 is performed in a similar manner, except that the reaction temperature is maintained at 60° C. and this time the aqueous layer is added after only 60 minutes, at which time the conversion of the aliphatic carbon-carbon double bonds is about 67%. The reaction is allowed to continue about 90 minutes after the aqueous layer is added. Proton NMR on the product indicates 98% conversion of the aliphatic carbon-carbon double bonds and about 1% impurities. The 5% WLT for this material is 267° C.

Comparative Run A is performed in the same manner as Examples 1 and 2, without addition of the aqueous phase. Time to 98% conversion is over 8 hours. Impurities are about 1%. 5% WLT is 265° C.

Comparative Run B is performed in the same manner as Examples 1 and 2, except that the aqueous layer is added at the beginning of the bromination reaction, at the same time as the tetraethylammonium tribromide solution is added. In this case, 98% conversion is seen after about 90 minutes, but impurities are over 3%. The 5% WLT for this material is 246° C.

Comparative Run A provides a baseline for comparison. Without the water addition, a product having a low amount of impurities and very good thermal stability, as indicated by 5% WLT. However, the time to reach 98% conversion is very long.

When water is added when the conversion is 67-73%, as in Examples 1 and 2, there is essentially no effect on impurity level or 5% WLT, but reaction time is decreased from 8 hours to 2½ to 3 hours.

Comparative Run B shows the effect of having the water in the process from the beginning of the reaction. A fast reaction is seen, but impurity levels increase. Comparative Run B illustrates the correlation between the impurity level, as measured by NMR, and 5% WLT. There is a very significant reduction in thermal stability in this case, compared to Comparative Run A and Examples 1 and 2, which correlates to the higher level of impurities in Comparative Run B.

EXAMPLE 3

A polystyrene-polybutadiene block copolymer (112.7 parts, 60% polybutadiene) and bromochloromethane (970.4 parts) are added to a 3-L round bottom flask with overhead stirrer, addition funnel, nitrogen inlet and reflux condenser. The mixture is heated to 64° C. using a heating mantle, producing a slightly hazy solution.

A quaternary ammonium tribromide is prepared by adding 630.5 parts (1.50 mol) of 50% aqueous tetraethylammonium bromide and 647.4 parts of bromochloromethane to a separate 3-L round bottom flask with bottom drain, overhead stirrer, addition funnel, and nitrogen inlet. The mixture is stirred as 199.9 parts (1.25 mol) of bromine in 113.4 parts of bromochloromethane are added, which results in an increase in the temperature of the reaction mixture from 22° C. to 35° C. Stirring is continued for 15 minutes, after which the mixture is allowed to separate into two liquid layers. The bottom organic layer is added to the styrene-butadiene solution over 10 minutes. This increases the pot temperature from 64° C. to 66° C. Twenty minutes after the quaternary ammonium tribromide addition is complete, the aqueous layer from the quaternary ammonium tribromide preparation is added. Conversion when the aqueous layer is added is about 68%. Heating is continued for an additional 1 hour (so the total reaction time is only 1.5 hours), maintaining the temperature between 64-66° C. The mixture is rapidly cooled to 49° C. It is transferred to a 3-L round bottom flask with bottom drain, overhead stirrer, addition funnel, and nitrogen inlet, using 242.6 parts of bromochloromethane to aid the transfer.

The organic and aqueous layers separate after a few minutes, and the aqueous layer is removed. The organic layer is washed with 260.4 parts of 10% aqueous sodium bisulfite solution further diluted with 1193.8 parts of deionized water, and then with 1262.0 parts of deionized water. The organic layer is diluted with 498.2 parts of bromochloromethane and is transferred in approximately equal two portions to separate 5-L flasks, each containing about 1965 parts of stirred 2-propanol, to precipitate the brominated polymer. The resulting slurries are filtered through a coarse glass-fritted funnel and washed with 2-propanol. The resulting wet cakes are dried under ambient conditions for 6 days, yielding 279.3 parts (89% yield) of brominated copolymer in the form of fluffy, white solids.

Proton NMR indicates 98.5% conversion has been achieved, with impurities being 1.3%. The 5% WLT is 267.4° C. Weight average molecular weight by GPC is 132,280.

EXAMPLES 4 AND 5, AND COMPARATIVE RUN C

Example 4 is a repeat of Example 3, except that the temperature of the bromination reaction is reduced to 60° C. The conversion is about 58% at the time of the aqueous phase is added. When the bromination reaction is terminated one hour after the aqueous phase is added, the conversion is 97.1% by proton NMR. Impurities by proton NMR are 1.2% and the 5% WLT is 264.2° C.

Example 5 is a repeat of Example 4, except the aqueous phase is added 50 minutes after the quaternary ammonium tribromide addition is complete, at which point the conversion is about 72%. When the bromination reaction is terminated one hour after the aqueous phase is added, the conversion is 98.5% by proton NMR. Impurities by proton NMR are 0.9% and the 5% WLT is 267.2° C.

Comparative Run C is performed under the same conditions as Examples 4 and 5, except the aqueous phase from the quaternary ammonium tribromide preparation is not added into the bromination reaction. After four hours reaction time, the conversion is only 92.7%. Impurities are 0.7% by proton NMR and the 5% WLT is 260.2° C.

EXAMPLE 6

To a 500-mL pressure bottle with addition line, stir bar, and nitrogen inlet are added 9.0 parts of polystyrene-polybutadiene co-polymer (60% polybutadiene, 0.1 mol eq. polybutadiene) and 104.8 parts of bromochloromethane. After purging the bottle with nitrogen, the bottle is sealed and the mixture is heated to 77° C. in a hot water bath.

A solution of tetraethylammonium tribromide is made separately, in the general manner described in Example 3, from 50.0 parts of a 50% aqueous tetraethylammonium bromide, 63.2 parts of bromochloromethane and 16.0 parts of bromine.

The organic layer from the tetraethylammonium tribromide preparation is added to the copolymer solution in the pressure bottle over 22 minutes. The addition line is then flushed with 12.5 parts of bromochloromethane, adding the flush to the bottle. Two minutes after the organic layer addition is complete, the upper aqueous layer from the tetraethylammonium tribromide preparation is added over 10 minutes. Conversion at the time the aqueous phase addition begins is 65-75%. One hour after starting the addition of the organic layer from the tetraethylammonium tribromide preparation, the reaction mixture is cooled, the pressure bottle is opened and the organic and aqueous layers are separated. The organic layer is washed with 23.5 parts of 10% aqueous sodium bisulfite solution further diluted with 96.7 parts of deionized water, and washed again with 100.8 parts of deionized water. The brominated copolymer is precipitated from the organic layer by adding it to 421 parts of stirred 2-propanol. The resulting slurry is filtered and washed with 87 parts of 2-propanol. The resulting wet cake is dried under ambient conditions overnight, yielding 22.3 parts (89% yield) of brominated copolymer in the form of fluffy, white solids.

Proton NMR indicates 98.5% conversion has been achieved, with impurities being 1.1%. The 5% WLT is 268.3° C. Weight average molecular weight by GPC is 128,790.

EXAMPLE 7

To a 500-mL pressure bottle with addition line, stir bar, and nitrogen inlet are added 9.0 parts of polystyrene-polybutadiene copolymer (60% polybutadiene, 0.1 mol eq. polybutadiene) and 104.8 parts of methylene chloride. After purging the bottle with nitrogen, the bottle is sealed and the mixture is heated to 65° C. in a hot water bath.

A solution of tetraethylammonium tribromide is made separately, in the general manner described in Example 3, from 50.6 parts of a 50% aqueous tetraethylammonium bromide, 41.2 parts of methylene chloride and 16.0 parts of bromine.

The organic layer from the tetraethylammonium tribromide preparation is added to the copolymer solution in the pressure bottle over 20 minutes. Immediately after the organic layer addition is complete, the upper aqueous layer from the tetraethylammonium tribromide preparation is added over 20 minutes. Conversion at the time the aqueous phase addition begins is 65-75%. Two hours after starting the addition of the organic layer from the tetraethylammonium tribromide preparation, the reaction mixture is cooled, the pressure bottle is opened and the organic and aqueous layers are separated. The organic layer is washed with an aqueous sodium bisulfite solution, and washed again with deionized water. The brominated copolymer is precipitated from the organic layer by adding it to stirred 2-propanol. The resulting slurry is filtered and washed with 2-propanol. The resulting wet cake is dried under ambient conditions overnight, yielding 18.9 parts (76% yield) of brominated copolymer in the form of fluffy, white solids.

Proton NMR indicates 99% conversion has been achieved, with impurities being 0.7%. The 5% WLT is 255.5° C. Weight average molecular weight by GPC is 108,840. The lower 5% WLT and lower molecular weight of this brominated material, compared to that of other Examples, is attributed to the lower molecular weight of the starting copolymer.

What is claimed is:

1. A process comprising reacting a butadiene polymer containing aliphatic carbon-carbon double bonds with a phenyltrialkylammonium tribromide, benzyltrialkylammonium tribromide or tetraalkylammonium tribromide in the presence of at least one solvent for the butadiene polymer, to form a brominated butadiene polymer and a phenyltrialkylammonium monobromide, benzyltrialkylammonium monobromide or tetraalkylammonium monobromide by-product, wherein the solvent for the butadiene polymer is not a solvent for the phenyltrialkylammonium monobromide, benzyltrialkylammonium monobromide or tetraalkylammonium monobromide by-product and further the solvent for the phenyltrialkylammonium monobromide, benzyltrialkylammonium monobromide or tetraalkylammonium monobromide by-product is added to the reaction mixture when from about 25 to 90% of the aliphatic carbon-carbon double bonds in the butadiene polymer have been brominated, and the remainder of the bromination reaction is conducted in the presence of the solvent for the phenyltrialkylammonium monobromide, benzyltrialkylammonium monobromide or tetraalkylammonium monobromide by-product.

2. A process comprising reacting a butadiene polymer containing aliphatic carbon-carbon double bonds with a phenyltrialkylammonium tribromide, benzyltrialkylammonium tribromide or tetraalkylammonium tribromide in the presence of at least one solvent for the butadiene polymer, to form a brominated butadiene polymer and a phenyltrialkylammonium monobromide, benzyltrialkylammonium monobromide or tetraalkylammonium monobromide by-product, wherein water is added to the reaction mixture when from about 25 to 90% of the aliphatic carbon-carbon double bonds in the butadiene polymer have been brominated, and the remainder of the bromination reaction is conducted in the presence of the water.

3. The process of claim 2, wherein the water is added when from about 50 to 80% of the aliphatic carbon-carbon double bonds in the butadiene polymer have been brominated.

4. The process of claim 3, wherein the is added when from about 60 to 75% of the aliphatic carbon-carbon double bonds in the butadiene polymer have been brominated.

5. The process of any of claim 2, wherein the butadiene polymer is reacted with a tetraalkylammonium tribromide.

6. The process of claim 5, wherein the butadiene polymer is reacted with a tetraethylammonium tribromide.

7. The process of claim 2, wherein the solvent for the butadiene polymer is a halogenated alkane or a halogenated aromatic compound.

8. The process of claim 2, wherein, after the addition of the water, the reaction is continued until at least 90% of the aliphatic carbon-carbon double bonds on the starting polymer have been brominated.

9. The process of claim 8, wherein, after the addition of the water, the reaction is continued until at least 90% of the aliphatic carbon-carbon double bonds on the starting polymer have been brominated.

10. The process of claim 2, wherein the butadiene polymer is a copolymer of butadiene and a vinyl aromatic monomer.

11. The process of claim 10, wherein the butadiene polymer is block copolymer of butadiene and styrene.

\* \* \* \* \*